July 16, 1929.　　　W. W. KELLY　　　1,721,124
CORN POPPER
Filed May 28, 1926
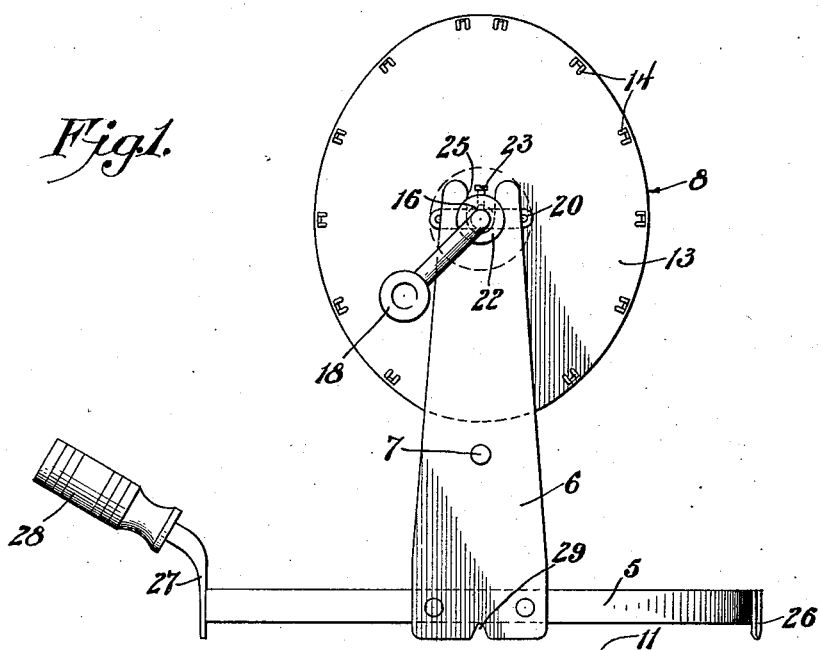
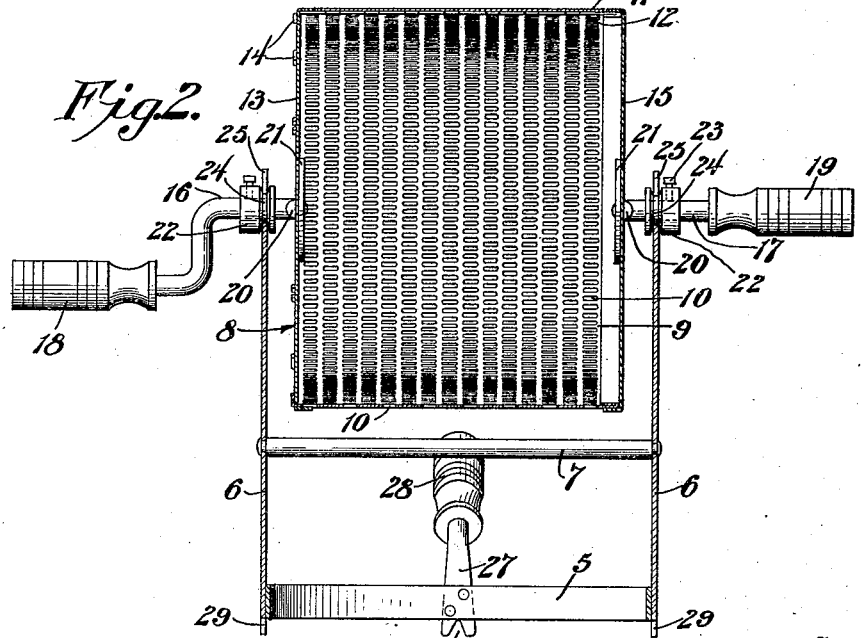
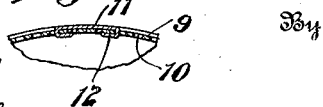
Inventor
William W. Kelly Patented July 16, 1929.

1,721,124

UNITED STATES PATENT OFFICE.

WILLIAM WILLARD KELLY, OF CLEVELAND, OHIO.

CORN POPPER.

Application filed May 28, 1926. Serial No. 112,305.

This invention relates to a corn popper, which is also adapted to be used in roasting nuts or coffee, renewing the freshness of breakfast foods, frying potato chips, or drying granular substances of various kinds.

The general object of the invention is to provide a device of this kind by the use of which the material handled will be agitated in a manner to successively present all sides of the granules or kernels to the heat, so that they will be uniformly heated throughout. The device is inexpensive, sanitary and practical in its construction, so that it may be conveniently held in position over a coal, gas or electric heater while being operated, and the cover may be easily taken off to remove the contents and to put in a fresh charge. The device is composed chiefly of aluminum, or other suitable metal having a comparatively high melting point, and the body portion or shell, which contains the material to be heated, is formed with numerous openings arranged in such a manner as not to interfere with the free movement of its contents.

One specific embodiment of the invention and the advantages resulting therefrom will be more fully explained in the following detailed description, which is to be read in connection with the accompanying drawing illustrating the preferred from thereof.

In the drawing:

Figure 1 is an end elevation of the invention.

Figure 2 is a vertical transverse section thereof.

Figure 3 is a detail view illustrating the means for securing the ends of the sheet metal forming the body or shell.

Referring in detail to the drawing, the main frame of the popper comprises a base 5, approximately in the shape of a circular band with vertical uprights 6 secured thereto at diametrically opposite points, and intermediately connected by a stay 7. A shell or receptacle 8 is provided for receiving the pop corn, nuts, or other material to be treated. This shell or receptacle is composed of sheet metal, and is in the shape of a cylindroid, the body portion 9 being formed from an approximately rectangular sheet of metal, having numerous rows of elongated holes 10. This body portion is substantially elliptical in cross section, and the ends of the sheet of metal, of which it is composed, are brought into abutting relation, and united by a strip 11 having spurs 12, which are inserted through certain of the holes 10 and clinched. One end 13 of the shell is secured thereto by spurs 14, which are formed on the edge of the body portion 9, and pass through suitable openings in the end piece 13, and are clinched thereto. The other end 15 is in the form of a removable cover, adapted to fit snugly over the end of the body portion 9.

The shell or receptacle 8 is rotatably supported at the upper ends of the uprights 6 by alined shafts or trunnions 16 and 17 secured at the centers of the end 13 and cover 15 respectively. The shaft 16 is formed with a crank having a wooden handle 18 for rotating the receptacle, while the shaft 17 has a wooden handle 19 secured to its outer end and adapted to be used in removing the cover 15. In order to secure the shafts 16 and 17 suitably to the ends of the receptacle, the inner end of each shaft is split and bent in opposite directions as indicated at 20, and riveted through the end of the receptacle to a washer 21 seated on the inner surface thereof. A bearing collar 22 is secured to each of the shafts 16 and 17 by means of a set screw 23 or the like, and is formed with a circumferential groove 24 adapted to fit in a recess 25 formed at the upper end of the upright 6. By this means, the receptacle 8 is suitably supported for rotation or oscillation, and the cover 15 is held against possibility of slipping off of the receptacle.

A foot 26 is secured to one side of the base 5 midway between the uprights 6, and diametrically opposite the foot 26 there is secured a foot 27, which extends upwardly and outwardly, and is provided with a wooden handle 28 adapted to be used in lifting the popper as a whole. The feet 26 and 27 and the lower ends of the uprights 6 are formed with suitable notches 29, adapted to fit over the prongs of a gas stove burner. The handle 28 may also be used for holding the popper on a stove having a smooth top to keep the same from slipping when the receptacle is rotated or oscillated.

The receptacle 8 is made in the shape of a cylindroid. That is, it is elliptical in cross section, so that as the receptacle is rotated or oscillated, the kernels or granules contained therein will first ride up part way to the upper side of the receptacle, and will then roll back to the bottom, so that all parts thereof will be uniformly heated. If the receptacle were made cylindrical in shape, the kernels or granules would continue to ride at the bottom unless agitated by cross pieces, or other means.

The holes or slots 10 are long enough and numerous enough to permit the heat to pass freely therethrough, and are narrow enough so as not to let the material sift out. This construction is much superior to wire screening, especially in popping corn, since the little sharp edges of the kernels stick to the uneven mesh of a screen, while with a smooth slotted surface, this does not happen.

In using the device for popping corn, the latter may be either dry or dampened with oil before it is placed in the receptable. The receptacle is simply rocked back and forth, throwing the corn first to one end and then to the other. The device may also be used in roasting nut meats, either in or out of the shell, also for roasting coffee, or in renewing the freshness of such breakfast foods as corn flakes. In making potato chips, they are dipped in fresh oil before putting them in the receptacle. This is to be much preferred over the old method of deep frying in a kettle where the oil is used over and over again. In using the device as a roaster or frier, the receptacle is rotated slowly and continuously. It may, of course, be power driven, if desired.

While I have shown and described in detail one form in which the invention may be embodied, it is obvious that various modifications may be made in the structure and arrangement of the constituent parts without any material departure from the salient features of the invention as claimed.

What is claimed is:

1. A device of the character described comprising a receptacle substantially in the shape of a cylindroid with alined shafts secured centrally to its respective ends, one of said ends being permanently secured to the body portion of the receptacle, the other end consisting of a removable cover fitting snugly thereon, collars secured to the respective shafts and each having a circumferential groove, and a pair of supports spaced at a fixed distance apart, and having seats engaging the respective grooves to rotatably support said receptacle and to positively hold the cover against coming off while the receptacle is so supported.

2. A device of the character described comprising a receptacle substantially in the shape of a cylindroid with alined shafts secured centrally to its respective ends, one of said ends being permanently secured to the body portion of the receptacle, the other end consisting of a removable cover fitting snugly thereon, collars secured to the respective shafts and each having a circumferential groove, a pair of uprights spaced at a fixed distance apart and having seats engaging the respective grooves for supporting the receptacle to positively hold the cover against coming off, and means connected with one of the shafts for rotating or oscillating the receptacle while it is so held, the body portion of said receptacle having peripheral rows of slots, each slot being elongated in a direction lengthwise of the cylindroid.

3. A device of the character described comprising a foraminous sheet metal receptacle substantially elliptical in cross section and having a fixed head at one end and a removable head at the other end; stub shafts extending outwardly from the centers of the heads; a crank secured to the stub shaft of the fixed head to turn the receptacle; a straight handle secured to the stub-shaft of the other head to facilitate the removal thereof; and spaced upright supports having open seats for the shafts to permit rotation or oscillation of the receptacle, and to permit the receptacle to be removed from the supports to remove the head.

4. A device of the character described comprising a foraminous sheet metal receptacle substantially elliptical in cross section and having a fixed head at one end and a removable head at the other end; stub shafts extending outwardly from the centers of the heads; a crank secured to the stub-shaft of the fixed head to turn the receptacle; a straight handle secured to the stub-shaft of the other head to facilitate the removal thereof; a support for the receptacle including a base ring having depending feet provided with notches; opposite uprights carried by the ring and having forked upper ends; grooved collars mounted on the stub shafts and fitting the forks to removably mount the receptacle for rotation or oscillation and to prevent dislodgment of the removable head; and an outstanding handle secured to the ring to carry the entire device.

In testimony that I claim the foregoing as my own, I have hereto affixed my signature.

WILLIAM WILLARD KELLY.